US012638904B2

(12) United States Patent　(10) Patent No.: US 12,638,904 B2
Atur et al.　(45) Date of Patent: May 26, 2026

(54) POWER CONSUMPTION MANAGEMENT USING CPU ALLOCATION AND CONFIGURATION

(71) Applicant: Rakuten Symphony, Inc., Tokyo (JP)

(72) Inventors: Sree Nandan Atur, San Mateo, CA (US); Mruthyunjaya Navali, Boston, MA (US); Ayushi Nikhil Patani, Bangalore (IN); Nikhil Rohidas Gawade, Bangalore (IN); Tushar Doshi, San Mateo, CA (US)

(73) Assignee: Rakuten Symphony, Inc., Tokyo (JP)

( * ) Notice: Subject to any disclaimer, the term of this patent is extended or adjusted under 35 U.S.C. 154(b) by 127 days.

(21) Appl. No.: 18/620,404

(22) Filed: Mar. 28, 2024

(65) Prior Publication Data

US 2025/0258533 A1　Aug. 14, 2025

(30) Foreign Application Priority Data

Feb. 13, 2024　(IN) .............................. 202441009717

(51) Int. Cl.
*G06F 1/26* (2006.01)
*G06F 1/32* (2019.01)
*G06F 1/3234* (2019.01)

(52) U.S. Cl.
CPC .................................. *G06F 1/3234* (2013.01)

(58) Field of Classification Search
CPC ....... G06F 1/3234; G06F 1/3206; G06F 1/329
See application file for complete search history.

(56) References Cited

U.S. PATENT DOCUMENTS

2024/0054595 A1* 2/2024 Ray ........................ G06F 9/4881
2024/0272959 A1* 8/2024 Miller ................... G06F 9/5061
2025/0123673 A1* 4/2025 Simlai ................... G06F 9/5094

* cited by examiner

*Primary Examiner* — Xuxing Chen
(74) *Attorney, Agent, or Firm* — David R. Stevens; Stevens Law Group

(57) ABSTRACT

Applications are executed on a host in association with a power profile and a pool of one or more CPUs that are isolated relative to the applications. The power profile includes a lowest power state that is suitable for the applications and achieves required performance for the workload being performed by the applications. The applications may have fractional CPU requirements collectively met by the number of CPUs in the pool. Other components, such as the operating system and one or more agents of one or more orchestrators may be allocated their own isolated pool of CPUs operating at a highest power state. The implementation of isolated CPUs that are shared by multiple applications may be performed by an agent of an orchestrator that is called as the CRI when instantiating containers.

20 Claims, 9 Drawing Sheets

Detect Failure of Host 402

Detect Lack of Available CPUs 404

Select Host For Sharing CPU(s) 406

Change CPU(s) to Shared CPU(s) 408

Instantiate Component(s) On Selected Host 410

Bind Container to Shared CPU(s) 412

400

POWER CONSUMPTION MANAGEMENT USING CPU ALLOCATION AND CONFIGURATION

CROSS-REFERENCE TO RELATED APPLICATION

This application claims the benefit of Indian Application No. 202441009717, filed Feb. 13, 2024, which is hereby incorporated herein by reference in its entirety.

BACKGROUND

Field of the Invention

This invention relates to managing power consumption through allocation and configuration of central processing units (CPU).

Background of the Invention

Containers are a convenient way to execute application instances in a variety of operating environments. A container is software that packages all dependencies of an application instance so that the application instance executes reliably and quickly in any given computing environment. For example, a container may include executable code, runtime, system tools, system libraries, settings, and the like that enable an application instance to execute on a host either with or without an underlying operating system.

A container may be allocated computing resources by a pod providing a logical host to the container and one or more other containers. In particular, in order to provide a degree of performance, stability, and security, one or more central processing units (CPU) of a host including many CPUs may be allocated to a container.

It would be an advancement in the art to improve the allocation of CPUs.

SUMMARY OF THE INVENTION

An apparatus includes a computing device including a plurality of processing devices and one or more memory devices operably coupled to the plurality of processing devices. The one or more memory devices storing executable code that, when executed by the plurality of processing devices, causes the plurality of processing devices to allocate a first portion of the plurality of processing devices to execute an operating system in a first power state. A second portion of the plurality of processing devices are allocated to execute one or more application instances in a second power state that has lower availability and lower power consumption than the first power state. The first portion of the plurality of processing devices are isolated from the one or more application instances. A third, fourth, or additional portions of the plurality of processing devices may be allocated to other application instances that likewise operate in the second power state and may be isolated from the one or more application instances.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
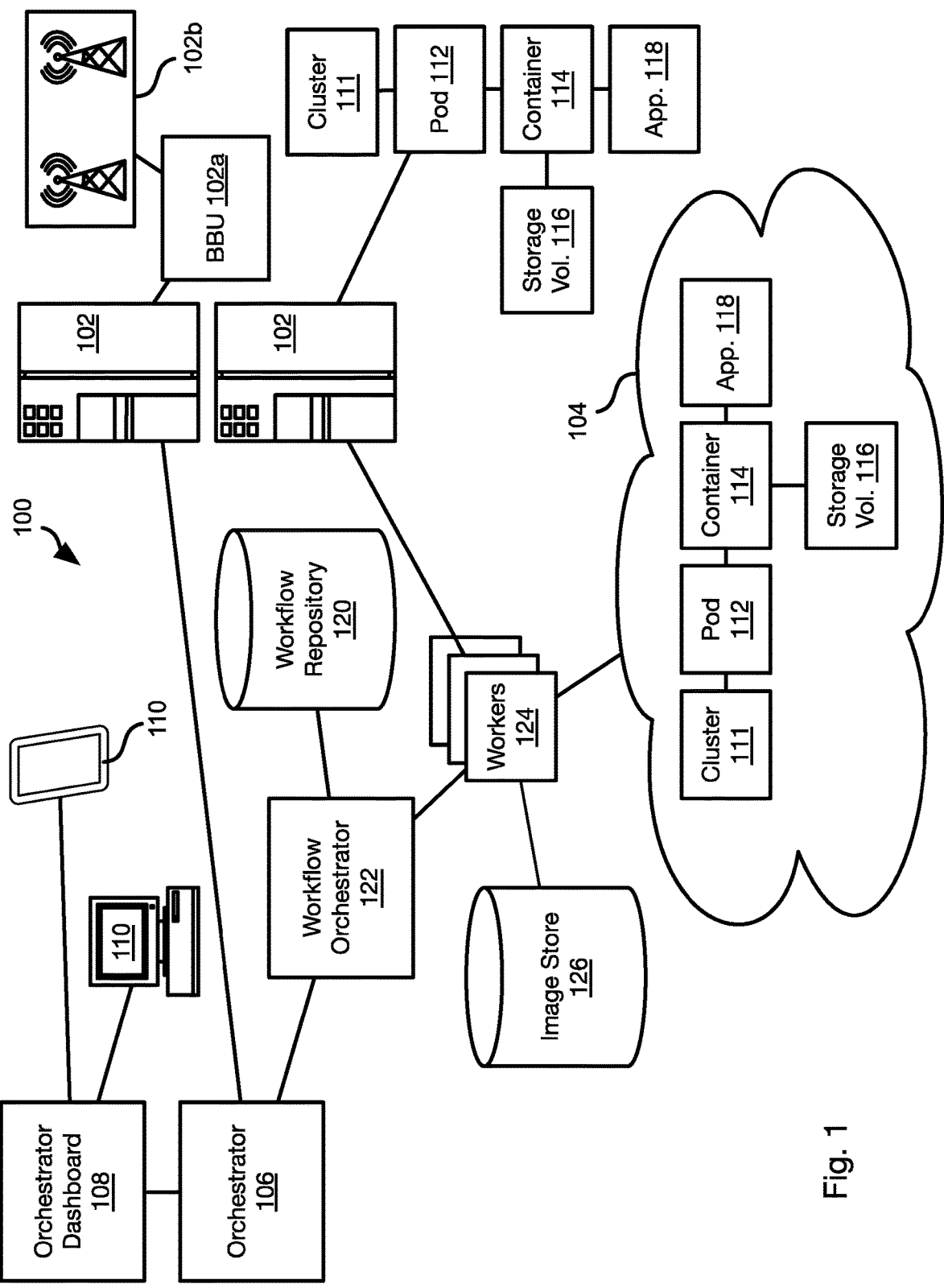
FIG. 1 is a schematic block diagram of a network environment in which containers may be deployed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 900 of FIG. 9.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
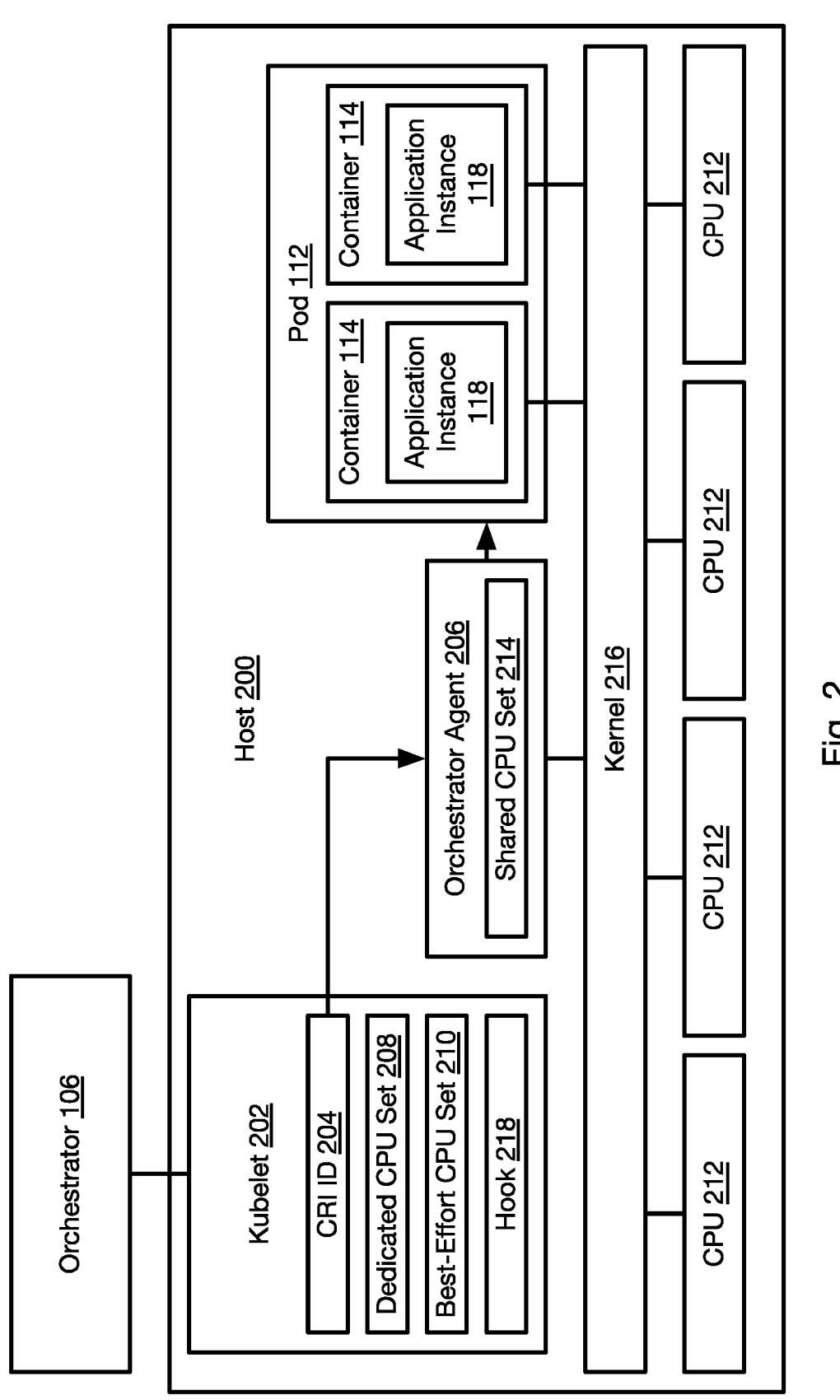
FIG. 2 is a schematic block diagram showing components for allocating CPUs in accordance with an embodiment.

Referring to FIG. 2, a host 200 may be a server 102, a unit of computing resources on the cloud computing platform 104, a virtual machine, or other computing device. A Kubelet 202 may execute on the host 200. The Kubelet 202 may implement a pod 112 on the host 200 and manage containers 114 and corresponding application instances 118 executing on the host 200. The Kubelet 202, and the pod 112 implemented by the Kubelet 202, may function as a logical host for multiple containers 114. The pod 112 may include a set of namespaces, a file system (e.g., built on a storage volume 116), or other data structures that are shared by containers 114 belonging to the pod 112.

The Kubelet 202 may be configured with a container runtime interface (CRI) identifier 204 that refers to an orchestrator agent 206 that is an agent of the orchestrator 106 and may communicate with the orchestrator 106 in order to perform the functions ascribed herein to the orchestrator agent 206. The Kubelet 202 may call the orchestrator agent 206 as a CRI to perform tasks with respect to containers 114 instantiated in the pod 112, such as to instantiate containers 114, suspend containers 114, de-instantiate containers 114, monitor the status of containers 114, monitor usage of computing resources by the containers 114, and other tasks. The orchestrator 106 performs tasks as instructed by the Kubelet 202 and performs additional functions in order to extend the functionality of the pod 112 and containers 114 beyond that provided by conventional KUBERNETES.

The Kubelet 202 may maintain a dedicated CPU set 208 and a best-effort CPU set 210. The sets 208, 210 are used by the Kubelet 202 to determine whether a CPU 212 is available for allocation or not. For example, once the number of CPUs included in the sets 208, 210 is equal to the total number of CPUs 212, then no further CPUs will be allocated by the Kubelet 202. The host 200 includes a plurality of CPUs 212 that may be referenced in either the dedicated CPU set 208, the best-effort CPU set 210, or remain unallocated. The Kubelet 202 may allocate the CPUs to one of the sets 208, 210 by means of the orchestrator agent 206, which may coordinate with the kernel 216 (or other software component) of the host 200 in order to bind CPUs 212 to a particular container 114 or group of containers. As used herein "CPU" may refer to an entire CPU chip including multiple cores, an individual processing core of a multi-core chip, a logical unit of processing defined by the cloud computing platform 104, or other processing device.

The CPUs 212 assigned to the dedicated CPU set 208 are available for use only by the container to which the CPUs 212 are allocated. Accordingly, the CPU set 208 may include entries including a container identifier corresponding to a container 114 and one or more CPU identifiers corresponding to the one or more CPUs 212 allocated to the container 114.

The CPUs 212 assigned to the best-effort CPU set 210 are available for use by any container 114 as well as other processes executing on the host 200, such as the Kubelet 202, orchestrator agent 206, the kernel 216, an operating system, or other processes or services implemented on the host 200. Processing time of the CPUs 212 in the best-effort CPU set may be allocated on a round-robin fashion, based on priorities, or any other criteria known in the art for sharing processing time among a plurality of processes. The best-effort CPU set 210 may include a listing of the identifiers of CPUs 212 assigned to the best-effort CPU set 210.

In KUBERNETES, the Kubelet 202 will process a request for allocating one or more CPUs to be shared by multiple containers 114 by simply adding references to the one or more CPUs to the best-effort CPU set 210. The multiple containers 114 are therefore not guaranteed allocation of the one or more CPUs.

When requesting that one or more CPUs 212 be dedicated to multiple containers ("dedicated shared CPUs"), the orchestrator 106 may include an annotation in a container specification passed to the Kubelet 202. The annotation may indicate a number of dedicated shared CPUs to allocate to two or more containers 114, such as those associated with container identifiers included in the annotation or he container specification. The annotation is not implemented by the Kubelet 202 but is passed by the Kubelet to the orchestrator agent 206 when called by the Kubelet 202 as the CRI to implement the container specification. The number of dedicated shared CPUs in the annotation may be the same as the number of shared CPUs in the container specification other than the annotation. The Kubelet 202 will therefore add that number of shared CPUs to the best-effort CPU set.

However, the orchestrator agent 206 will receive the annotation and add the same number of CPUs to a shared CPU set 214 maintained by the orchestrator agent 206 independent from the Kubelet 202. For example, the shared CPU set 214 may include entries that each include a listing of one or more identifiers of one or more CPUs 212 and a listing of two or more container identifiers of containers 114 for which the one or more CPUs 212 are dedicated shared CPUs. The orchestrator agent 206 will further cause the kernel 216 to bind the one or more CPUs to the two or more containers 114 such that the one or more CPUs are dedicated to the two or more containers 114 while being usable by any of the two or more containers 114.

In some embodiments, the Kubelet 202 may include a hook 218 that is configured to be accessed by the orchestrator 106. For example, the hook 218 may be an application programming interface (API), daemon, command line interface, script interpreter, or other interface that may be configured by the orchestrator 106 to control operation of the Kubelet 202. In some embodiments, some or all of the functions ascribed herein to the orchestrator agent 206 may be performed using the hook 218.

Figure 3A:
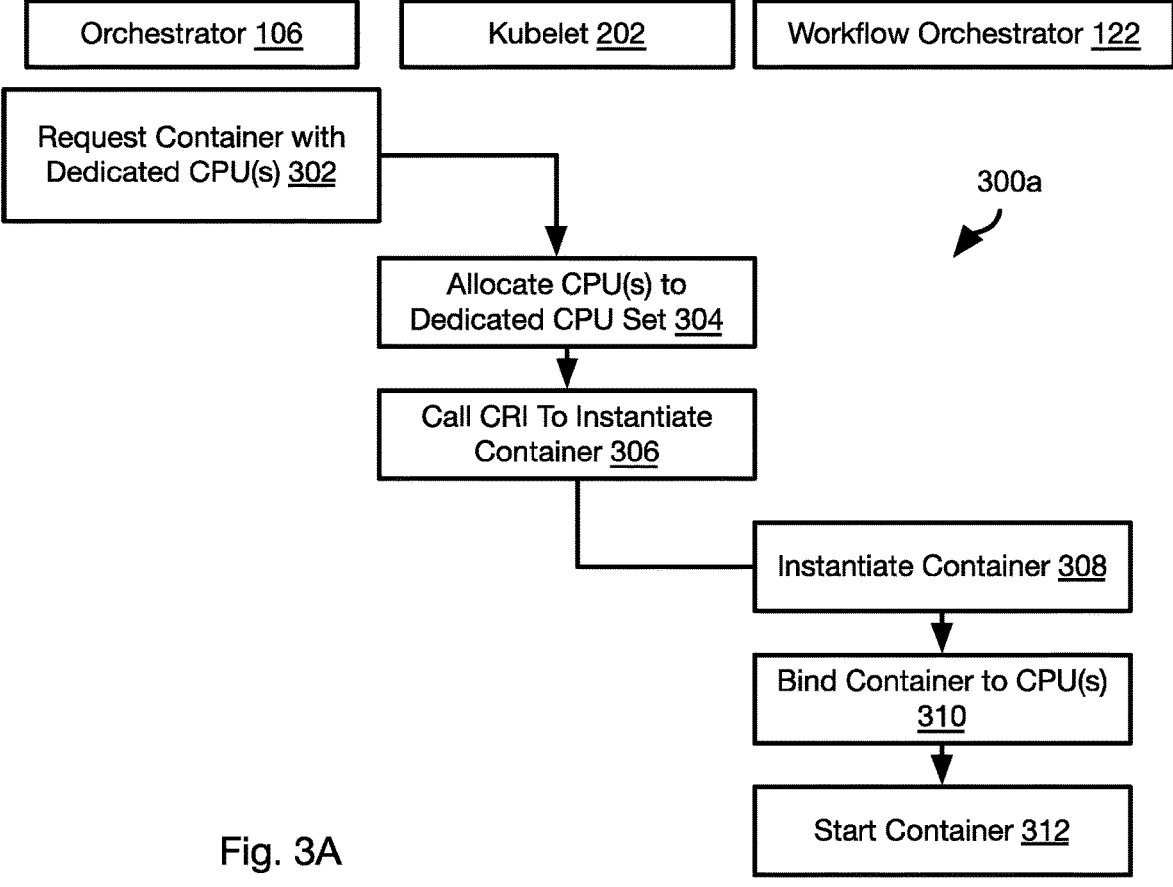
FIG. 3A is a process flow diagram of a method for allocating dedicated CPUs in accordance with an embodiment.
Figure 3B:
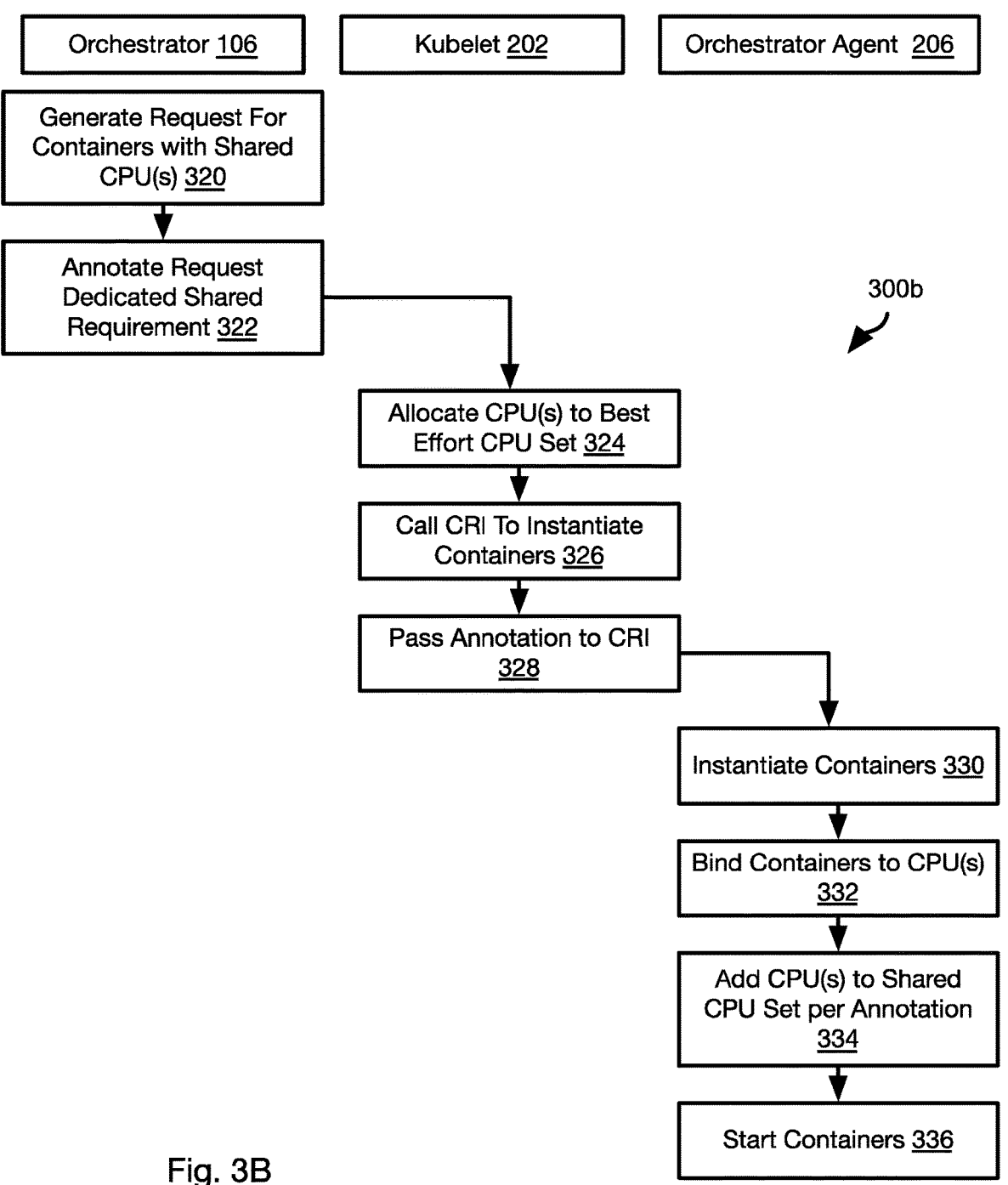
FIG. 3B is a process flow diagram of a method for allocating dedicated shared CPUs in accordance with an embodiment.

FIG. 3A illustrates a method 300a for instantiating a container with one or more dedicated CPUs. FIG. 3B illustrates a method 300b for instantiating two or more containers with dedicated shared CPUs.

Referring specifically to FIG. 3A, the method 300a may include the orchestrator 106 requesting 302 instantiation of a container 114 with a number of dedicated CPUs, i.e., a number from one to the total number of available CPUs that have not been previously allocated. The request may be in the form of a container specification including the number of dedicated CPUs and other parameters for instantiating the container 114. The Kubelet 202 receives the request and allocates 304 the number of CPUs, i.e., adds identifiers of the number of CPUs 212 to the dedicated CPU set 208 either with or without an association to an identifier of the container 114 to be instantiated. Allocating 304 the number of CPUs may include decrementing a number of available CPUs of the CPUs 212 by the number of dedicated CPUs in the request.

The Kubelet 202 further calls 306 the CRI, i.e., orchestrator agent 206, to instantiate the container 114. The Kubelet 202 may pass the number of dedicated CPUs to the orchestrator agent 206 along with any other parameters included in the request. The orchestrator agent 206 instantiates 308 the container 114 and binds 310 the container to the number of dedicated CPUs in the request. The orchestrator agent 206 may then start 312 execution of the container 114 and perform any other tasks required for the proper functioning of the container 114. The container 114 will then commence executing on the one or more CPUs bound to the container 114 at step 310. The container 114 may therefore commence execution of the application instances 118 of the container 114.

FIG. 3B illustrates a method 300b for instantiating two or more containers 114 with one or more dedicated shared CPUs that are usable only by the two or more containers 114. The method 300a may include the orchestrator 106 generating 320 a request for instantiation of a container 114 with a number of shared CPUs, i.e., a number from one to the total number of available CPUs that have not been previously allocated. The request may be in the form of a container specification including the number of shared CPUs and other parameters for instantiating the two or more containers 114. The orchestrator 106 further annotates 322 the request with an indication that the shared CPUs are to be dedicated shared CPUs for use by only the two or more containers 114.

The Kubelet 202 receives the annotated request and allocates 324 the number of CPUs, i.e., adds the number of CPUs to the best-effort CPU set 210. The Kubelet may also add identifiers of the CPUs 212 to the best-effort CPU set 210 either with or without an association with identifiers of the two or more containers 114 to be instantiated. Allocating 324 the number of CPUs may include decrementing a number of available CPUs of the CPUs 212 by the number of CPUs from the request.

The Kubelet 202 further calls 326 the CRI, i.e., orchestrator agent 206, to instantiate the two or more containers 114. As part of calling 326 the CRI, or in a separate action, the Kubelet passes 328 the annotation to the orchestrator agent 206 along with other parameters included in the request. Since the Kubelet 202 interprets the request for one or more shared CPUs by simply adding the one or more shared CPUs to the best-effort CPU set 210, the Kubelet 202 may or may not pass the number of shared CPUs from the request to the orchestrator agent 206 since the Kubelet's interpretation of the request does not require binding of the two or more containers to a particular CPU 212.

The orchestrator agent 206 instantiates 330 the two or more containers 114 and binds 332 the two or more containers 114 to one or more CPUs 212 in number equal to the number of shared CPUs specified in the request at step 320. The binding of step 332 may include binding each container 114 to each of the one or more shared CPUs 212 such that each container 114 may use each CPU 212 of the one or more shared CPUs 212. Thus, the one or more shared CPUs 212 bound to the two or more containers 114 become one or more dedicated shared CPUs 212 and are no longer part of the best-effort CPU set. The one or more dedicated shared CPUs 212 are therefore no longer available to execute an operating system or other processes that are not bound to one or more specific CPUs 212. The one or more dedicated shared CPUs 212 bound at step 332 may be selected from CPUs 212 referenced in the best-effort CPU set 210 and may include the CPUs 212 added to the best-effort CPU set at step 324.

The orchestrator agent 206 further adds 334 the number of dedicated shared CPUs 212 to the shared CPU set 214. Adding 334 the number of dedicated shared CPUs 212 to the shared CPU set 214 may include incrementing the number of CPUs in the shared CPU set 214. Step 334 may include adding an entry mapping identifiers of the two or more containers 114 to one or more identifiers of the one or more dedicated shared CPUs 212.

The orchestrator agent 206 may then start 336 execution of the two or more containers 114 and perform any other tasks required for the proper functioning of the wo or more containers 114. The two or more container 114 will then commence executing on the one or more CPUs bound to the two or more containers 114 at step 332. The two or more containers 114 may commence execution of the application instances 118 of the two or more containers 114.

In an alternative or additional approach to the method 300b, the containers 114 that are to share one or more dedicated shared CPUs 212 may be instantiated in separate iterations of the method 300b, such as one at a time. Accordingly, a single container 114 is instantiated 330 and bound 332 to the one or more shared CPUs 212.

One or more additional containers 114 may then be instantiated according to the method 300b except that step 324 will not be repeated. For example, for the one or more additional containers 114, the annotation from step 322 may specify that the one or more additional containers 114 are to be bound to one or more dedicated shared CPUs 212 from a previous iteration of the method 300b.

Figure 4:
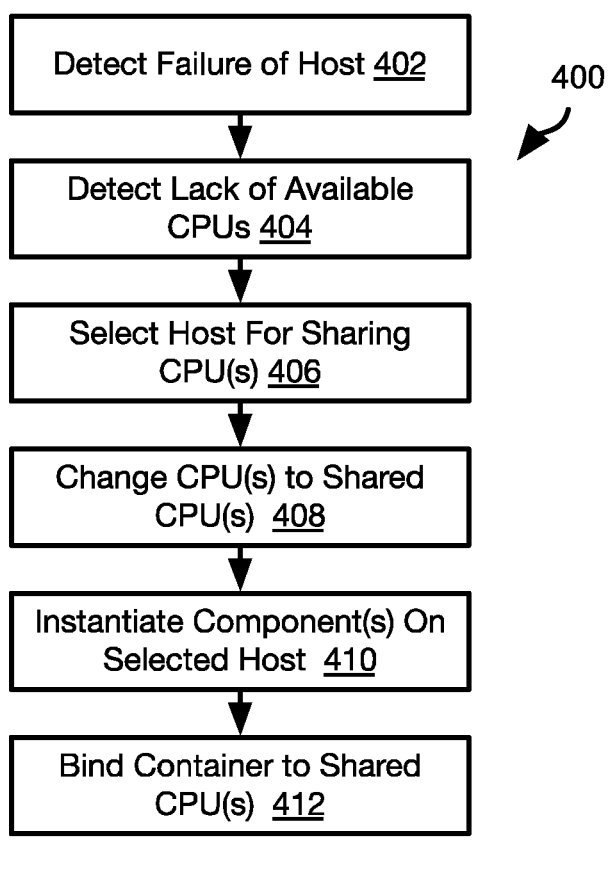
FIG. 4 is a process flow diagram of a method for dynamically allocating a CPU for executing an application on failover in accordance with an embodiment.
Figure 5:
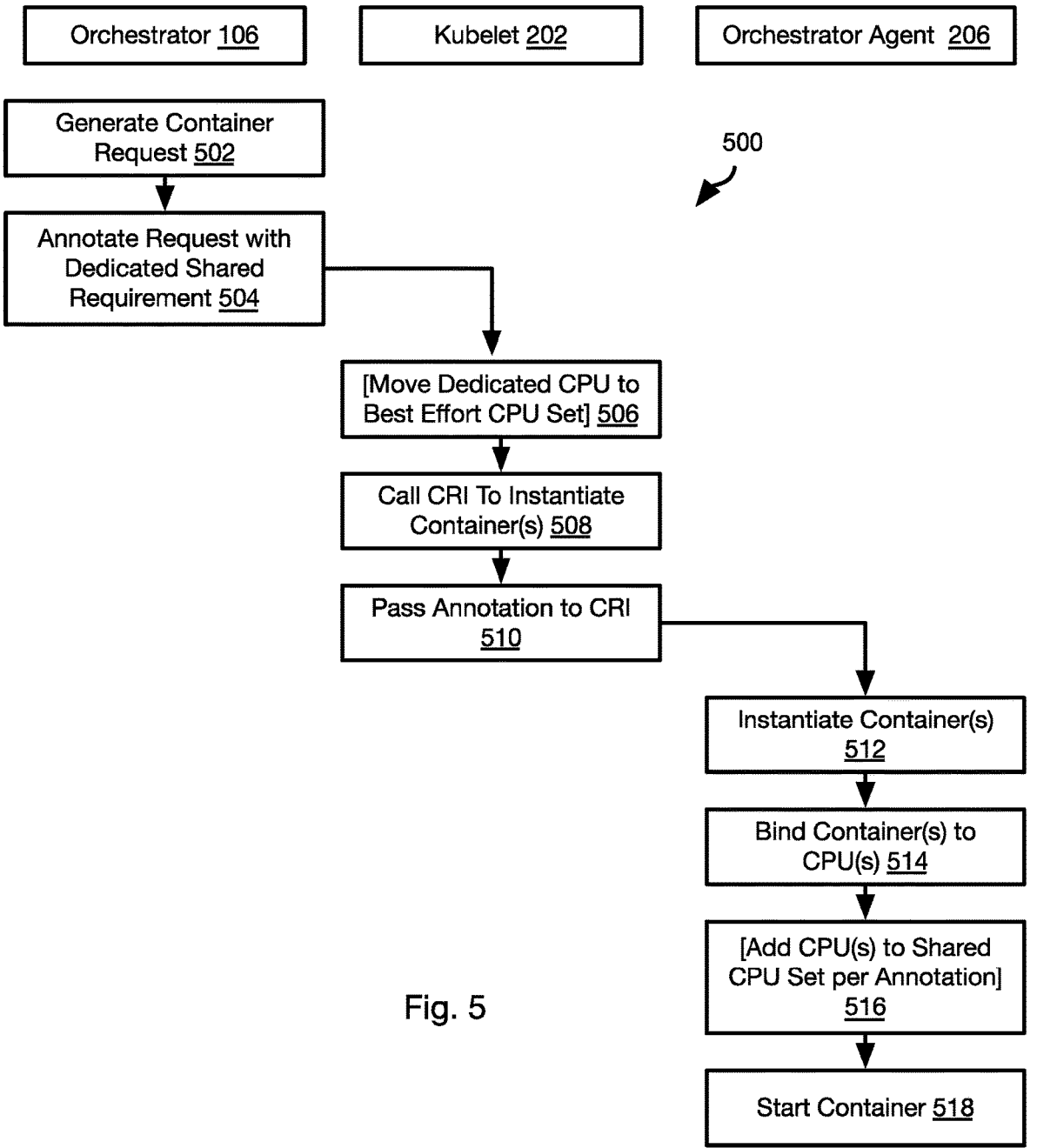
FIG. 5 is a process flow diagram illustrating processing on a substitute host to dynamically allocate CPUs on failover in accordance with an embodiment.

Referring to FIGS. 4 and 5, in some scenarios, a host 200 may fail. Any pods 112, containers 114, application instances 118, and possibly storage volumes 116 of the host 200 may therefore need to be re-instantiated on another host 200. However, in some scenarios, there is no host 200 with CPUs available that are not already dedicated to executing one or more other containers 114 and application instances 118. The methods 400 and 500 of FIGS. 4 and 5 may therefore be executed to perform failover with the dynamic re-allocation of currently-allocated CPUs.

Referring specifically to FIG. 4, The illustrated method 400 may be performed by the orchestrator 106, a workflow invoked by the orchestrator 106 and executed by a worker 124, or some other component.

The method 400 may include detecting 402 failure of a host 200 ("the failed host") executing one or more containers and one or more corresponding application instances 118 that will need to be relocated ("the relocated components"). Detecting 402 failure of the host 200 may include the host 200 failing a periodic health check performed by the orchestrator 106 or a workflow invoked by the orchestrator 106. Detecting 402 failure may include a time passed since a heartbeat message was received from the host 200 exceeding a maximum threshold. Detecting 402 failure may include failing to receive a response to a request within a timeout period. Detecting 402 failure may include detecting failure of a network connection to the host 200.

The method 400 may include detecting 404 a lack of available CPUs that are not already dedicated to other containers 114 or to other processes. For example, the orchestrator 106 may maintain an inventory of CPUs on each host 200. Each time a CPU is dedicated on a host 200, the host 200 may so indicate to the orchestrator 106, which then updates the inventory. Accordingly, step 404 may include detecting that the inventory does not include any non-dedicated CPUs. Note that each host 200 may require a certain number of best effort CPUs to execute an operating system or other processes of the host 200. Accordingly, a certain number of CPUs may be excluded from consideration when detecting 404 whether any CPUs are not already dedicated.

The method 400 may include selecting 406 a new host 200 for the relocated components ("the substitute host"). The substitute host may be executed based on one or more criteria. The substitute host may be least loaded in terms of memory, processor, time, networking data transmission, or other measure of loading. The substitute host 200 may be selected based on criticality: the substitute host may be the host with the least number of components dependent on the components executing on the substitute host. Dependencies may be in the form of another component having a network connection, application session, or other relationship to one of the relocated components. A dependency may include another component having one or more environmental variables referencing one of the relocated components. A dependency may be indirect: a component that is dependent on a component that is dependent on one of the relocated components may also be deemed dependent on one of the relocated components.

The substitute host may be selected based on one or more requirements such as an affinity requirement, anti-affinity requirement, or other criteria. An affinity requirement may specify that the relocated components have a required degree of proximity to one or more other components: same server, same chassis, same server rack, same data center, same cloud region, etc. An anti-affinity requirement may specify that the relocated components have a required degree of distance relative to one or more other components: different server, different chassis, different server rack, different data center, different cloud region, etc. A latency requirement may specify a maximum permitted latency between one or more of the relocated components and one or more other components.

There may be multiple relocated components such that multiple substitute hosts may be selected for each component of the relocated components. In the following description, instantiation of a component on a substitute host is described with the understanding that this process may be performed for each relocated component and the corresponding substitute host selected for each relocated components. In addition, multiple relocated components may be instantiated on the same substitute host in a like manner.

The method 400 may include changing 408 one or more dedicated CPUs on the substitute host to shared CPUs. The CPUs selected to be changed 408 may be selected as being dedicated to a component having the least number of components dependent thereon, such as dependent as defined above with respect to step 406. The CPUs selected to be changed 408 may be selected as being the least utilized, e.g., least fraction of processing cycles used. Changing 408 one or more dedicated CPUs on the substitute host may include changing 408 one or more dedicated shared CPUs as described above to be additionally shared with one or more of the relocated components.

Changing 408 one or more dedicated CPUs on the substitute host may include adding one or more dedicated shared CPUs to the best effort set 210 followed by changing the CPUs to dedicated shared CPUs as described below with respect to FIG. 4.

The method 400 may include instantiating 410 the one or more relocated components on the substitute host and binding 412 the one or more relocated components to the CPUs changed at step 408. Instantiating 410 the one or more relocated component may include configuring the one or more components to function on the substitute host, such as establishing application sessions, network connections, or other relationships to other components of a cluster 111. Instantiating 410 may include configuring other components to use one or more new address of the one or more relocated components.

FIG. 5 illustrates an example method for dynamically allocating a shared CPU to a relocated component embodied as a container 114 executing an application instance 118 ("the relocated container"). The orchestrator 106 may generate 502 a container request requesting instantiation of the relocated container, which includes the application instance 118. The request may specify a number of shared CPUs, i.e., the number of CPUs selected for changing at step 408. The request may be in the form of a container specification including the number of shared CPUs and other parameters for instantiating the container 114. The orchestrator 106 further annotates 504 the request with an indication that the shared CPUs are to be dedicated shared CPUs for use by the relocated container one or more containers for which the dedicated shared CPUs were previously dedicated ("the one or more current containers") according to the method 300*a* or the method 300*b*.

The Kubelet 202 receives the annotated request. If the CPUs referenced by the request are currently dedicated or dedicated shared CPUs, the method 500 may include moving 506 the CPUs to the best effort CPU set 210 (e.g., if the CPUs were in the dedicated CPU set 208). If the CPUs are already in the best effort CPU set 210, then no action is taken (e.g., if the CPUs are already dedicated shared CPUs). Where CPUs are moved 506, the Kubelet may also add identifiers of the CPUs 212 that were moved to the best-effort CPU set 210 either with or without an association with an identifier of the relocated container.

The Kubelet 202 further calls 508 the CRI, i.e., orchestrator agent 206, to instantiate the relocated container. As part of calling 508 the CRI, or in a separate action, the Kubelet passes 510 the annotation to the orchestrator agent 206 along with other parameters included in the request. Since the Kubelet 202 interprets the request for one or more shared CPUs by simply adding the one or more shared CPUs to the best-effort CPU set 210, the Kubelet 202 may or may not pass the number of shared CPUs from the request to the orchestrator agent 206 since the Kubelet's interpretation of the request does not require binding of the two or more containers to a particular CPU 212.

The orchestrator agent 206 instantiates 512 the relocated container, which includes instantiating the application instance 118 of the relocated container, and binds 514 the relocated container to one or more CPUs 212 in number equal to the number of shared CPUs specified in the request at step 502. The binding of step 514 may include binding the relocated container to each of the one or more shared CPUs 212 such that the relocated container and the one or more current containers may all use the one or more shared CPUs 212.

Where the CPUs 212 to which the relocated container is bound were previously dedicated CPUs to a single current container, the orchestrator agent 206 further adds 516 the number of dedicated shared CPUs 212 to the shared CPU set 214. Adding 516 the number of dedicated shared CPUs 212 to the shared CPU set 214 may include incrementing the number of CPUs in the shared CPU set 214. Step 516 may include adding an entry mapping an identifier of the relocated container to one or more identifiers of the one or more dedicated shared CPUs 212.

The orchestrator agent 206 may then start 518 execution of the relocated container and perform any other tasks required for the proper functioning of the relocated container. The relocated container will then commence executing on the one or more CPUs bound to the relocated container at step 514. The relocated container may then commence execution of the application instance 118 of the relocated container.

Figure 6:
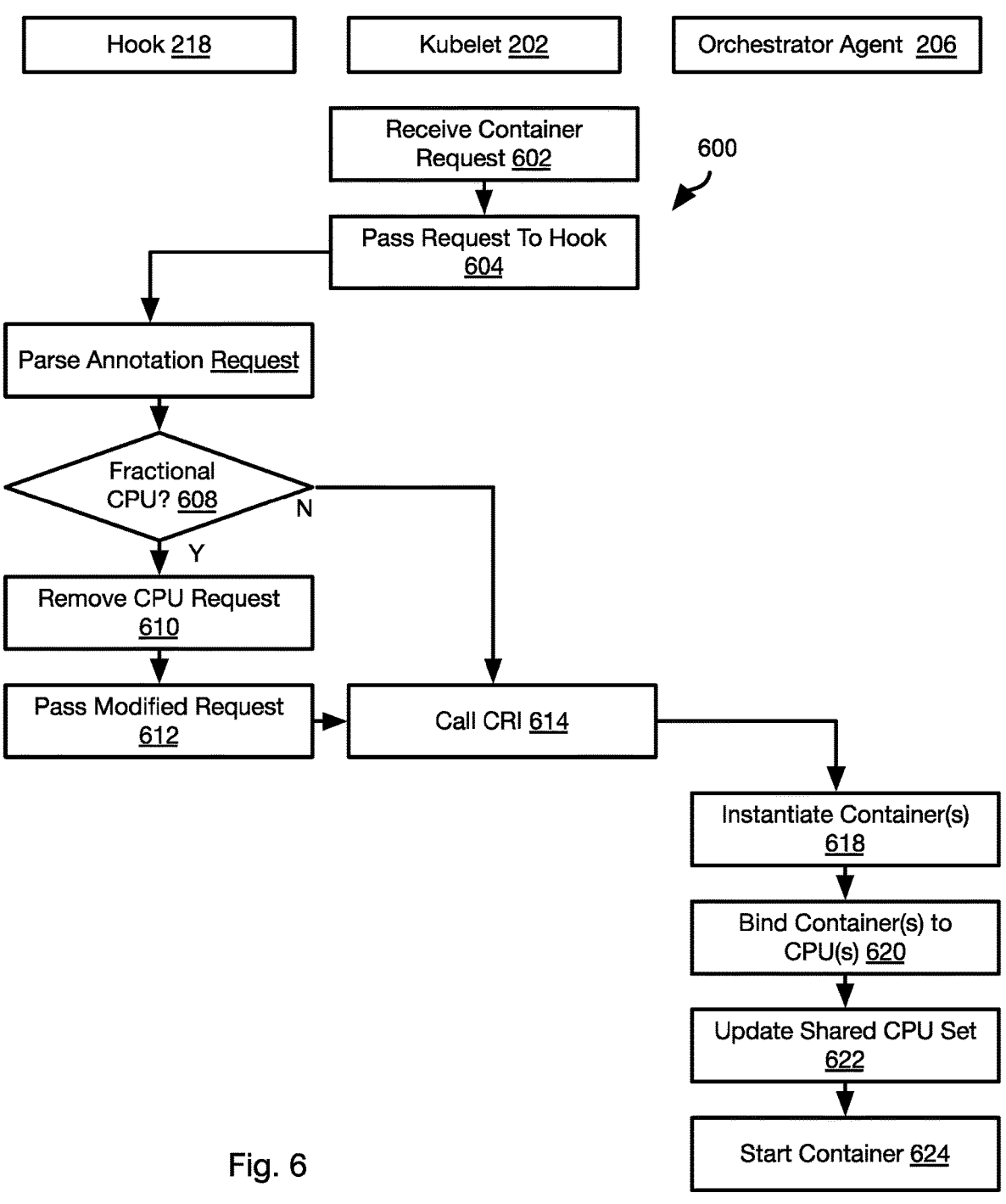
FIG. 6 is process flow diagram of a method for allocating fractional CPUs in accordance with an embodiment.

Referring to FIG. 6, the illustrated method 600 may be used to handle a request for instantiation of container 114 on a pod 112, the request including a request for a fraction of a CPU 212 (e.g., ½, 25%, 75%, or some other fraction).

In conventional KUBERNETES, a Kubelet 202 will handle a request for a fractional CPU by incrementing the number of allocated CPUs and/or decrementing the number of available CPUs while simply adding a CPU to the best-effort CPU set 210. Thus, the requester is not granted even shared exclusivity to a CPU 212 while at the same time reducing the number of CPUs available to be allocated. The illustrated method 600 may be used to remedy this deficiency.

The Kubelet 202 receives 602 a request to instantiate a container. The Kubelet 302 passes 604 all or part of the request to the hook 218. The hook 218 parses the request to determine 608 whether the request includes a request for a fractional CPU. If not, the hook 218 invokes no action with respect to fractional CPUs and calls 614 the CRI, which may be the orchestrator agent 206 or a conventional CRI.

If the request does include a request for a fractional CPU, the hook 218 may modify the request by removing 610 the request for a fractional CPU. The request may be further modified to include an annotation indicating the container to be instantiated should be bound to a dedicated shared CPU corresponding to the fractional CPU requested. For example, where the fraction is ½ (50%), the annotation may include the fraction or otherwise indicate that the container to be instantiated may shared a dedicated shared CPU with no more than one other container. Where the fraction is ¼ (25%), the annotation may include the fraction or otherwise indicate that the container to be instantiated may share a dedicated shared CPU with no more than three other containers. In some embodiments, the request for a fractional CPU is simply ignored and no annotation corresponding to the request for a fractional CPU is added.

The hook 218 may pass 612 the request as modified at step 610 to the Kubelet 202. The Kubelet 202 may then call 614 a CRI to instantiate a container according to the request. The CRI may be a conventional CRI or the orchestrator agent 206. Where the CRI is a conventional CRI, the CRI will instantiate a container 114 as specified in the request and configure the container 114 to use the CPUs 212 in the best-effort CPU set 210. The request may include the image used to instantiate the container 114 or the image may be retrieved from the image store 126 or some other source.

Where the CRI is the orchestrator agent 206, the orchestrator agent 206 may instantiate the container 114 and configure the container 114 to use the CPUs 212 in the best-effort CPU set 210. Alternatively, the orchestrator agent 206 may instantiate the container 114 and configure the container 114 to use a dedicated shared CPU 212.

For example, the orchestrator agent 206 may instantiate 618 the container 114 and bind 620 the container 114 to one or more CPUs 212. Instantiating 618 the container 114 may include instantiating an application instance 118 within the container 114. The binding of step 620 may include binding the container 114 one or more dedicated shared CPUs 212 such that each container 114 bound to the one or more dedicated shared CPUs 212 uses approximately a fraction of a CPU specified in the request to instantiate each container 114. For example, one CPU 212 may be bound to two containers 114 that each requested ½ a CPU 212. Four containers may be bound to two dedicated shared CPUs 212 such that each container is effectively allocated ½ a CPU 212. The binding may be more sophisticated and take into account usage by each container 114 bound to one or more CPUs such that each container 114 receives a percentage of CPU cycles approximately (e.g., within 10 percent) equal to the fraction of a CPU requested for the container 114.

The orchestrator agent 206 may further update 622 the shared CPU set 214. For example, where either (a) there are no dedicated shared CPUs 212 or (b) there are no dedicated shared CPUs 212 that are not fully utilized, the orchestrator agent 206 may remove a CPU 212 from the best-effort CPU set 210 and add the CPU 212 to the shared CPU set 214, such as by adding an identifier of the CPU 212 to the shared CPU set 214 either with or without an association to the identifier of the container 114 instantiated at step 618. A set of one or more CPUs 212 may be deemed not fully utilized if a sum of the fraction of a CPU requested in the request to instantiate each container 114 bound to the one or more CPUs 212 is less than the number of CPUs in the set of one or more CPUs 212.

If there is a set of one or more dedicated shared CPUs 212 that are not fully utilized, the container 114 instantiated at step 618 may be bound 620 to that set of one or more dedicated shared CPUs 212 and the shared CPU set 214 may be updated to associate an identifier of the container instantiated at step 618 with the set of one or more dedicated shared CPUs 212.

The orchestrator agent 206 may then start 624 execution of the container 114 and perform any other tasks required for the proper functioning of the container 114. The container 114 will then commence executing on the one or more CPUs bound to the container 114 at step 620. The container 114 may commence execution of the application instance 118 hosted by the container 114.

Figure 7:
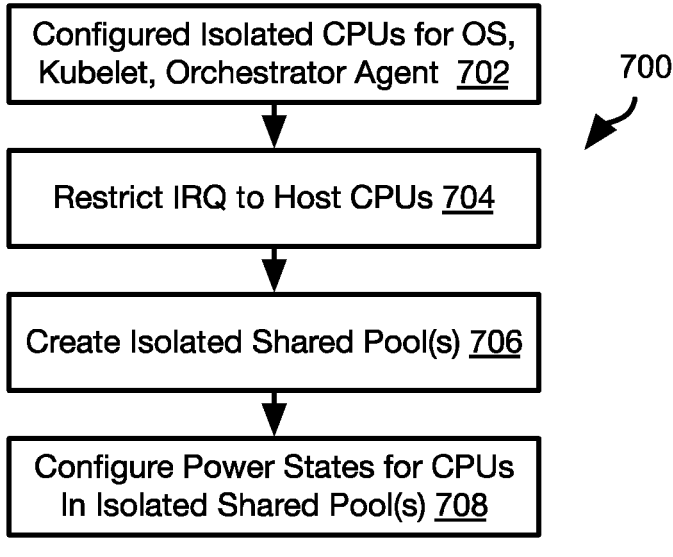
FIG. 7 is a process flow diagram of a method for configuring a host to implement shared isolated CPUs according to a power profile in accordance with an embodiment.

Referring to FIG. 7, the allocation of CPUs 212 to a container 114 may be performed in a coordinated manner with respect to other containers 114 executing on the same host 200. In particular, containers 114 may be assigned to pools of shared isolated CPUs in order to reduce power consumption by the host 200.

For example, the method 700 may include configuring 702 one or more CPUs 212 as isolated shared CPUs ("the host CPUs") for the exclusive use of the operating system of the host 200, the Kubelet 202, and the orchestrator agent 206. The number of the host CPUs may vary and may be 2, 4, or more, such as up to 16. The number of host CPUs may be less than the number of CPUs 212 that are not host CPUs. The host CPUs may execute other control functions, such as the control planes for one or more pods 112, one or more pods 112 themselves (not including containers 114 managed by the pods 112), any Kubernetes host services in addition to the Kubelet 202, or other control functions. The method 700 may further include configuring 704 the host 200 to permit interrupt requests (IRQ) only for the host CPUs. The host CPUs may be individually allocated among components executed thereon: e.g., 2 CPUs 212 allocated to the operating system and 2 CPUs 212 allocated to Kubelet 202 and orchestrator agent 206.

The method 700 may include creating 706 one or more isolated shared pools for use by the containers 114 ("application pools"). The applications pools are pools of one or more CPUs 212 that are not host CPUs and that are allocated to one or more containers 114. The number of CPUs 212 in each application pool and the containers 114 assigned to each application pool may be determined in order to reduce power consumption by the host 200. The method 800 discussed below provides one example of the configuration of application pools and the assignment of containers 114 to each application pool.

The method 700 may further include configuring 708 the power states of the CPUs 212. For example, the host CPUs may be assigned a power state that has the highest availability whereas the CPUs of each application pool are assigned a power state that has the lowest availability that permits application instances 118 executing thereon to function properly.

Each CPU 212 may operate in a plurality of power states, referred to herein as "cstates." Each cstate has a different power consumption. Each make and model of processor may have different cstates. As used herein, $C_0$ refers an active mode in which executable code is being executed and CPU 212 is operating at maximum clock speed and in which the CPU 212 consumes the most power as compared to other cstates. In the remaining cstates ($C_1$ to $C_N$), the amount of time required to return to the $C_0$ cstate increases with increasing index value (e.g., $C_n$ takes longer to return to $C_0$ than $C_{n-1}$, etc., where n is a value from 2 to N-1). Likewise, the amount of power consumed by a cstate decreases with index value (e.g., $C_n$ consumes less power than $C_{n-1}$). In some of the cstates, e.g., $C_1$ to $C_M$, M<N, the CPU 212 is still able to execute instructions. In other cstates, the CPU 212 is not able to execute instructions, e.g., $C_{M+1}$ or $C_{M+1}$ to $C_{N-1}$. Power consumption is reduced by such actions as turning off power to the CPU 212, turning off and/or slowing down a clock, flushing caches to memory, storing an execution state to memory, or other actions.

In one example embodiment, the host CPUs 212 are maintained in the lowest (highest availability and highest power consumption) power state (e.g., C0) and the CPUs 212 of each application pool are maintained in a higher (lower availability) power state, such as C6. However, lower power states may be used as required by the application instances 118 executed by each application pool.

The actions of the method 700 may be implemented according to a power profile, such as a power profile generated according to the method 800. The method 700 may include generating instructions to a basic input output system (BIOS), kernel, operating system, or other component executing on the host 200. The method 700 may be implemented by changing the "grub" settings of a LINUX operating system, such as the isol_cpus, tuned.isolcpus, or other parameters. The method 700 may include instantiating or configuring controllers to implement the power profile.

Once a host is configured according to the method 700, the host 200 will manage execution of components on the host CPUs and in the application pools. In particular, the waking of CPUs 212 to execute containers 114 may be managed by functionality of a processing device implementing the power states (e.g., cstates) of the CPUs 212.

Figure 8:
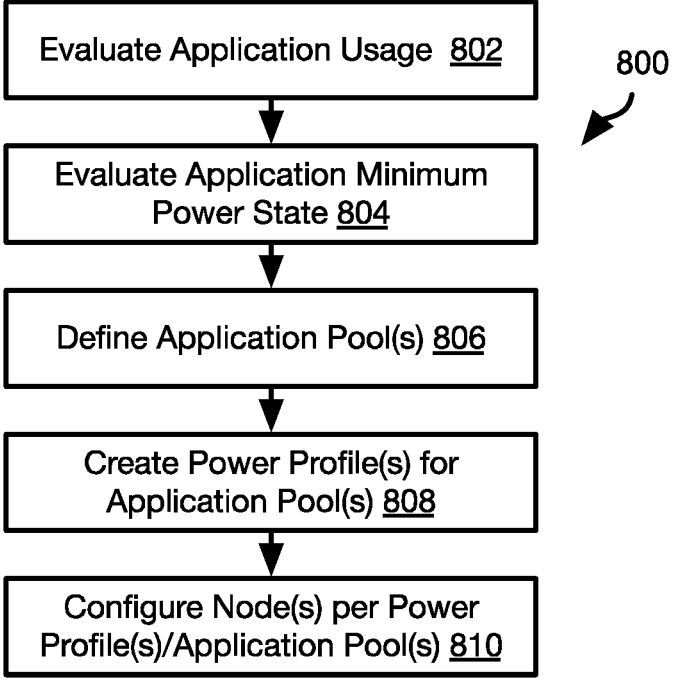
FIG. 8 is a process flow diagram of a method for generating a power profile for configuring shared isolated CPUs in accordance with an embodiment.

FIG. 8 illustrates a method 800 for generating power profiles for configuring one or more application pools on a host 200 and assigning application instances 118 and corresponding containers 114 to an application pool. The method 800 may be used with a set of application instances 118 to be instantiated on a host 200, such as according to a manifest or as otherwise instructed by the orchestrator 106, workflow orchestrator 122, or other component.

The method 800 may include evaluating 802 application usage. Step 802 may include monitoring operating of an application instance 118 of a particular executable, such as an executable in the image store 126. Step 802 may include retrieving pre-configured estimates of application usage for a particular executable for use as an approximate for other instances 118 of that executable. Application usage may be expressed in terms of number of CPUs, which may include fractional CPUs, such as at a level of granularity of 0.5 CPU. Application usage may additionally include memory usage by an application instance 118.

The method 800 may include evaluating 804 the minimum power state required for each application instance 118. The minimum power state may be determined experimentally by increasing the cstate (decreasing availability and decreasing power usage) under a test load until the application instance 118 fails (e.g., crashes) or otherwise fails to meet a required level of performance. For example, some telecommunication applications may not tolerate the delay required to awake in some cstates, such as on a host 200 functioning as a distributed unit (DU). Step 804 may include retrieving previously determined minimum power state stored for each application instance 118, e.g., for an executable from which the application instance 118 was instantiated.

The method 800 may include defining 806 application pools. Step 806 may include selecting both of (a) a number of CPUs to allocation to each application pool and (b) the application instances 118 (and corresponding containers 114) to be assigned to each application pool.

Step 806 may account for various factors. The factors listed below may each be weighted to determine where to assign an application instance 118. Not all of the factors listed below need to be satisfied by each assignment of each application instance 118.

1. Application instances 118 with common minimum power states may be assigned to a common application pool. However, the power state of an application pool may also be set to the highest minimum power state of application instance 118 of the application instances 118 assigned to the application pool. This requirement helps to increase the amount of time that CPUs 212 remain in an inactive state.

2. Application instances 118 with fractional CPU requirements may be assigned to a common application pool such that the sum of the CPU requirements is equal to the number of CPUs in the application pool. However, where not possible the sum may be less than the number of CPUs, such as by less than one. This requirement also helps to increase the number and amount of time that CPUs 212 remain in an inactive state.

3. Anti-affinity requirements may require that an application instance 118 be allocated a different CPU than another application instance 118 or be exclusively allocated one or more CPUs. An anti-affinity requirement may work against factors 1 and 2.

4. Anti-affinity requirements may require that application instances 118 managed by one pod 112 not share CPUs 212 with application instances 118 managed by a different pod 112.

5. The number of CPUs assigned to an application instance 118 or group of application instances 118 (e.g., containers 114 executing application instances 118) should meet guaranteed quality of service (QOS) requirements. QoS requirements may include fractional allocations, "best effort" allocations, and/or burstable allocations that may temporarily exceed an allocation, e.g., a fractional allocation.

Step 806 may include defining application pools and assigning application instances 118 for all application instances 118 to be instantiated on a host 200. In this manner, the possibly conflicting requirements of factors 1, 2, 3, and 4 outlined above may be processed to improve the expected power consumption. Step 806 may be executed with respect to multiple hosts 200 to obtain a configuration of application pools and assignments of application instances that will reduce power consumption relative to other possible configurations, such as according to an optimization algorithm.

The method 800 may include creating 808 power profiles for each application pool. The power profile may define such information as the number of CPUs and the power state (e.g., cstate) of the CPUs of each application pool. The power profile may be in the form of a script or other executable that when executed on the host 200 will allocate and assign the CPUs 212 of the host 200 as defined in the power profile.

The method 800 may then include configuring 810 the host 200 according to the power profiles from step 808. Configuring the power profiles may be performed as part of a configuration of the host 200, e.g., configuration the host 200 from a bare metal state. For example, the power profile may be part of a zero-touch provisioning (ZTP) and/or bare metal management (BMM) process by which the host 200 is automatically discovered and configured. Step 810 may be part of installing the application instances 118 on the host 200 and assigning the application instances 118 to the application pools configured according to the power profiles. Assigning application instances 118 to the application pools may be performed by the orchestrator agent 206 as described above. In particular, the orchestrator agent 206 may perform the binding of the CPUs 212 of application pools to particular containers 114 and/or pods 112.

The benefit of the approach described above with respect to FIGS. 7 and 8 may be understood using the examples described below. In particular, application instances 118 may be assigned to achieve the power savings outlined in the examples below.

In a first example, consider a bare metal server with 48 cores where 4 cores are host CPUs and the remainder are available for use by application including one or more application instances 118, as shown in Table 1. In the tables below, bold indicates host cores (e.g., CPUs 212) and underline indicates cores assigned to an application.

TABLE 1

Example CPU Allocation

| CPU | Core |
|---|---|
| 0 | 0 |
| 0 | 24 |
| 1 | 1 |
| 1 | 25 |
| 2 | 2 |
| 2 | 26 |
| 3 | 3 |
| 3 | 27 |
| 4 | 4 |
| 4 | 28 |
| 5 | 5 |
| 5 | 29 |
| 6 | 6 |
| 6 | 30 |
| 7 | 7 |
| 7 | 31 |
| 8 | 8 |
| 8 | 32 |
| 9 | 9 |
| 9 | 33 |
| 10 | 10 |
| 10 | 34 |
| 11 | 11 |
| 11 | 35 |
| 12 | 12 |
| 12 | 36 |
| 13 | 13 |
| 13 | 37 |
| 14 | 14 |
| 14 | 38 |
| 15 | 15 |
| 15 | 39 |
| 16 | 16 |
| 16 | 40 |
| 17 | 17 |
| 17 | 41 |
| 18 | 18 |
| 18 | 42 |
| 19 | 19 |
| 19 | 43 |
| 20 | 20 |
| 20 | 44 |
| 21 | 21 |
| 21 | 45 |
| 22 | 22 |
| 22 | 46 |
| 23 | 23 |
| 23 | 47 |

Suppose that a workload is a simple script invokes just enough processing to keep each CPU at 100% count=0 while True:

count=0 while True:

count = count + 1

Further suppose that an application uses 22 cores (e.g., CPUs 212), uses one hyper thread from each core (see Table 2) versus two hyper threads from each core (Table 3), i.e., processor is packed with hyper siblings. The change in power consumption of the scenario of Table 2 to the scenario of Table 3 is a 20 percent reduction: 138 Watts to 111 Watts.

16

TABLE 2

Example CPU Allocation: One Hyperthread per Core

| CPU | Core | C0 | C1 | C6 |
|---|---|---|---|---|
| 0 | 0 | | | |
| 0 | 24 | | | |
| 1 | 1 | | | |
| 1 | 25 | | | |
| 2 | 2 | 100 | 0 | 0 |
| 2 | 26 | 0 | 0 | 100 |
| 3 | 3 | 100 | 0 | 0 |
| 3 | 27 | 0 | 0 | 100 |
| 4 | 4 | 100 | 0 | 0 |
| 4 | 28 | 0 | 0 | 100 |
| 5 | 5 | 100 | 0 | 0 |
| 5 | 29 | 0 | 0 | 100 |
| 6 | 6 | 100 | 0 | 0 |
| 6 | 30 | 0 | 0 | 100 |
| 7 | 7 | 100 | 0 | 0 |
| 7 | 31 | 0 | 0 | 100 |
| 8 | 8 | 100 | 0 | 0 |
| 8 | 32 | 0 | 0 | 100 |
| 9 | 9 | 100 | 0 | 0 |
| 9 | 33 | 0 | 0 | 100 |
| 10 | 10 | 100 | 0 | 0 |
| 10 | 34 | 0 | 0 | 100 |
| 11 | 11 | 100 | 0 | 0 |
| 11 | 35 | 0 | 0 | 100 |
| 12 | 12 | 100 | 0 | 0 |
| 12 | 36 | 0 | 0 | 100 |
| 13 | 13 | 100 | 0 | 0 |
| 13 | 37 | 0 | 0 | 100 |
| 14 | 14 | 100 | 0 | 0 |
| 14 | 38 | 0 | 0 | 100 |
| 15 | 15 | 100 | 0 | 0 |
| 15 | 39 | 0 | 0 | 100 |
| 16 | 16 | 100 | 0 | 0 |
| 16 | 40 | 0 | 0 | 100 |
| 17 | 17 | 100 | 0 | 0 |
| 17 | 41 | 0 | 0 | 100 |
| 18 | 18 | 100 | 0 | 0 |
| 18 | 42 | 0 | 0 | 100 |
| 19 | 19 | 100 | 0 | 0 |
| 19 | 43 | 0 | 0 | 100 |
| 20 | 20 | 100 | 0 | 0 |
| 20 | 44 | 0 | 0 | 100 |
| 21 | 21 | 100 | 0 | 0 |
| 21 | 45 | 0 | 0 | 100 |
| 22 | 22 | 100 | 0 | 0 |
| 22 | 46 | 0 | 0 | 100 |
| 23 | 23 | 100 | 0 | 0 |
| 23 | 47 | 0 | 0 | 100 |

TABLE 3

Example CPU Allocation: Two Hyperthreads per Core

| CPU | Core | C0 | C1 | C6 |
|---|---|---|---|---|
| 0 | 0 | | | |
| 0 | 24 | | | |
| 1 | 1 | | | |
| 1 | 25 | | | |
| 2 | 2 | 100 | 0 | 0 |
| 2 | 26 | 100 | 0 | 0 |
| 3 | 3 | 100 | 0 | 0 |
| 3 | 27 | 100 | 0 | 0 |
| 4 | 4 | 100 | 0 | 0 |
| 4 | 28 | 100 | 0 | 0 |
| 5 | 5 | 100 | 0 | 0 |
| 5 | 29 | 100 | 0 | 0 |
| 6 | 6 | 100 | 0 | 0 |
| 6 | 30 | 100 | 0 | 0 |
| 7 | 7 | 100 | 0 | 0 |
| 7 | 31 | 100 | 0 | 0 |
| 8 | 8 | 100 | 0 | 0 |
| 8 | 32 | 100 | 0 | 0 |

17

TABLE 3-continued

Example CPU Allocation: Two Hyperthreads per Core

| CPU | Core | C0 | C1 | C6 |
|---|---|---|---|---|
| 9 | 9 | 100 | 0 | 0 |
| 9 | 33 | 100 | 0 | 0 |
| 10 | 10 | 100 | 0 | 0 |
| 10 | 34 | 100 | 0 | 0 |
| 11 | 11 | 100 | 0 | 0 |
| 11 | 35 | 100 | 0 | 0 |
| 12 | 12 | 100 | 0 | 0 |
| 12 | 36 | 100 | 0 | 0 |
| 13 | 13 | 0 | 0 | 0 |
| 13 | 37 | 0 | 0 | 100 |
| 14 | 14 | 0 | 0 | 100 |
| 14 | 38 | 0 | 0 | 100 |
| 15 | 15 | 0 | 0 | 100 |
| 15 | 39 | 0 | 0 | 100 |
| 16 | 16 | 0 | 0 | 100 |
| 16 | 40 | 0 | 0 | 100 |
| 17 | 17 | 0 | 0 | 100 |
| 17 | 41 | 0 | 0 | 100 |
| 18 | 18 | 0 | 0 | 100 |
| 18 | 42 | 0 | 0 | 100 |
| 19 | 19 | 0 | 0 | 100 |
| 19 | 43 | 0 | 0 | 100 |
| 20 | 20 | 0 | 0 | 100 |
| 20 | 44 | 0 | 0 | 100 |
| 21 | 21 | 0 | 0 | 100 |
| 21 | 45 | 0 | 0 | 100 |
| 22 | 22 | 0 | 0 | 100 |
| 22 | 46 | 0 | 0 | 100 |
| 23 | 23 | 0 | 0 | 100 |
| 23 | 47 | 0 | 0 | 100 |

In a second example, suppose an application uses 10 cores, Use 1 hyper thread from each core (Table 4) versus two hyperthreads (e.g. packed with hypersiblings) from each core (Table 5). The change in power consumption of the scenario of Table 2 to the scenario of Table 3 is a 17 percent reduction: 111 Watts to 99 Watts.

TABLE 4

Example CPU Allocation: One Hyperthread per Core

| CPU | Core | C0 | C1 | C6 |
|---|---|---|---|---|
| 0 | 0 | | | |
| 0 | 24 | | | |
| 1 | 1 | | | |
| 1 | 25 | | | |
| 2 | 2 | 100 | 0 | 0 |
| 2 | 26 | 0 | 0 | 100 |
| 3 | 3 | 100 | 0 | 0 |
| 3 | 27 | 0 | 0 | 100 |
| 4 | 4 | 100 | 0 | 0 |
| 4 | 28 | 0 | 0 | 100 |
| 5 | 5 | 100 | 0 | 0 |
| 5 | 29 | 0 | 0 | 100 |
| 6 | 6 | 100 | 0 | 0 |
| 6 | 30 | 0 | 0 | 100 |
| 7 | 7 | 100 | 0 | 0 |
| 7 | 31 | 0 | 0 | 100 |
| 8 | 8 | 100 | 0 | 0 |
| 8 | 32 | 0 | 0 | 100 |
| 9 | 9 | 100 | 0 | 0 |
| 9 | 33 | 0 | 0 | 100 |
| 10 | 10 | 100 | 0 | 0 |
| 10 | 34 | 0 | 0 | 100 |
| 11 | 11 | 100 | 0 | 0 |
| 11 | 35 | 0 | 0 | 100 |
| 12 | 12 | 0 | 0 | 100 |
| 12 | 36 | 0 | 0 | 100 |
| 13 | 13 | 0 | 0 | 100 |
| 13 | 37 | 0 | 0 | 100 |
| 14 | 14 | 0 | 0 | 100 |

18

TABLE 4-continued

Example CPU Allocation: One Hyperthread per Core

| CPU | Core | C0 | C1 | C6 |
|---|---|---|---|---|
| 14 | 38 | 0 | 0 | 100 |
| 15 | 15 | 0 | 0 | 100 |
| 15 | 39 | 0 | 0 | 100 |
| 16 | 16 | 0 | 0 | 100 |
| 16 | 40 | 0 | 0 | 100 |
| 17 | 17 | 0 | 0 | 100 |
| 17 | 41 | 0 | 0 | 100 |
| 18 | 18 | 0 | 0 | 100 |
| 18 | 42 | 0 | 0 | 100 |
| 19 | 19 | 0 | 0 | 100 |
| 19 | 43 | 0 | 0 | 100 |
| 20 | 20 | 0 | 0 | 100 |
| 20 | 44 | 0 | 0 | 100 |
| 21 | 21 | 0 | 0 | 100 |
| 21 | 45 | 0 | 0 | 100 |
| 22 | 22 | 0 | 0 | 100 |
| 22 | 46 | 0 | 0 | 100 |
| 23 | 23 | 0 | 0 | 100 |
| 23 | 47 | 0 | 0 | 100 |

TABLE 5

Example CPU Allocation: Two Hyperthreads per Core

| CPU | Core | C0 | C1 | C6 |
|---|---|---|---|---|
| 0 | 0 | | | |
| 0 | 24 | | | |
| 1 | 1 | | | |
| 1 | 25 | | | |
| 2 | 2 | 100 | 0 | 0 |
| 2 | 26 | 100 | 0 | 0 |
| 3 | 3 | 100 | 0 | 0 |
| 3 | 27 | 100 | 0 | 0 |
| 4 | 4 | 100 | 0 | 0 |
| 4 | 28 | 100 | 0 | 0 |
| 5 | 5 | 100 | 0 | 0 |
| 5 | 29 | 100 | 0 | 0 |
| 6 | 6 | 100 | 0 | 0 |
| 6 | 30 | 100 | 0 | 0 |
| 7 | 7 | 0 | 0 | 100 |
| 7 | 31 | 0 | 0 | 100 |
| 8 | 8 | 0 | 0 | 100 |
| 8 | 32 | 0 | 0 | 100 |
| 9 | 9 | 0 | 0 | 100 |
| 9 | 33 | 0 | 0 | 100 |
| 10 | 10 | 0 | 0 | 100 |
| 10 | 34 | 0 | 0 | 100 |
| 11 | 11 | 0 | 0 | 100 |
| 11 | 35 | 0 | 0 | 100 |
| 12 | 12 | 0 | 0 | 100 |
| 12 | 36 | 0 | 0 | 100 |
| 13 | 13 | 0 | 0 | 100 |
| 13 | 37 | 0 | 0 | 100 |
| 14 | 14 | 0 | 0 | 100 |
| 14 | 38 | 0 | 0 | 100 |
| 15 | 15 | 0 | 0 | 100 |
| 15 | 39 | 0 | 0 | 100 |
| 16 | 16 | 0 | 0 | 100 |
| 16 | 40 | 0 | 0 | 100 |
| 17 | 17 | 0 | 0 | 100 |
| 17 | 41 | 0 | 0 | 100 |
| 18 | 18 | 0 | 0 | 100 |
| 18 | 42 | 0 | 0 | 100 |
| 19 | 19 | 0 | 0 | 100 |
| 19 | 43 | 0 | 0 | 100 |
| 20 | 20 | 0 | 0 | 100 |
| 20 | 44 | 0 | 0 | 100 |
| 21 | 21 | 0 | 0 | 100 |
| 21 | 45 | 0 | 0 | 100 |
| 22 | 22 | 0 | 0 | 100 |

TABLE 5-continued

| Example CPU Allocation: Two Hyperthreads per Core | | | | |
|---|---|---|---|---|
| CPU | Core | C0 | C1 | C6 |
| 22 | 46 | 0 | 0 | 100 |
| 23 | 23 | 0 | 0 | 100 |
| 23 | 47 | 0 | 0 | 100 |

Table 6 summarizes expected reductions in power consumptions for other configurations of processor cores.

TABLE 6

| Power Consumption Reduction with Hyperthread Packing | | | |
|---|---|---|---|
| | Power | Power Consumption (W) | |
| Cores utilized | Savings (%) | No Packing | Hyperthread Packing |
| 22 | 20 | 138 | 111 |
| 10 | 17 | 119 | 99 |
| 4 | 16 | 86 | 73 |
| 2 | 9 | 70 | 64 |

In currently available KUBERNETS (1.26), there are only three available policies, allocation of full CPUs, distribution across a number of CPUs, and alignment of CPUs with a particular socket. As outlined in the examples above, CPU isolation wastes power and not all containers 114 need CPU isolation (e.g., have noisy neighbor problem). Existing options in CPU manager and topology manager are cluster wide. Pods are allowed to decide if isolation is needed or not. Isolation can be implemented within pods of the same application or pods of different applications.

For example, for two applications assigned only full CPUs and managed by a pod using current approaches power would be wasted by unused cores (see Tables 2 and 4). In contrast, if a CPU were allowed to be shared between applications, this waste would be reduced (see Tables 3 and 5). Although this reduces waste, isolation is not achieved, which may result in noisy neighbor problems. Using the approach of FIGS. 7 and 8, the need for isolation can be accounted for while also attempting to pack application instances 118 to avoid waste. The approach of FIGS. 7 and 8 may be extended to achieve isolation between pods 112: the allocation of CPUs 212 to application instances 118 as outlined above. In addition, variation in policies may be achieved: the application instances 118 of a first pod 112 may tolerate one another and may be allocated CPUs 212 non-exclusively with respect to one another but exclusive of the application instances of a second pod 112. The application instances 118, e.g., hyperthreads of the containers 114 of application instances 118, may therefore be packed, i.e., multiple hyperthreads per core. The application instances 118 of the second pod may be allocated exclusively or non-exclusively with respect to one another.

For example, Table 7 illustrates a scenario where all the containers in a pod are packed onto hyper-threads. For example, Table 7 illustrates a scenario where a KUBERNETES job scheduler has main container 114 and multiple sidecar containers 114.

TABLE 7

| Packing of Containers of a Pod | | | | | |
|---|---|---|---|---|---|
| CPU | Core | Pod | Container | Container | Container |
| 0 | 0 | 1 | 1 | 2 | |
| 0 | 1 | 1 | | | 3 |
| 1 | 2 (At C6) | 1 | | | |
| 1 | 3 (At C6) | 1 | | | |
| 2 | 4 (At C6) | 1 | | | |
| 2 | 5 (At C6) | 1 | | | |

Figure 9:
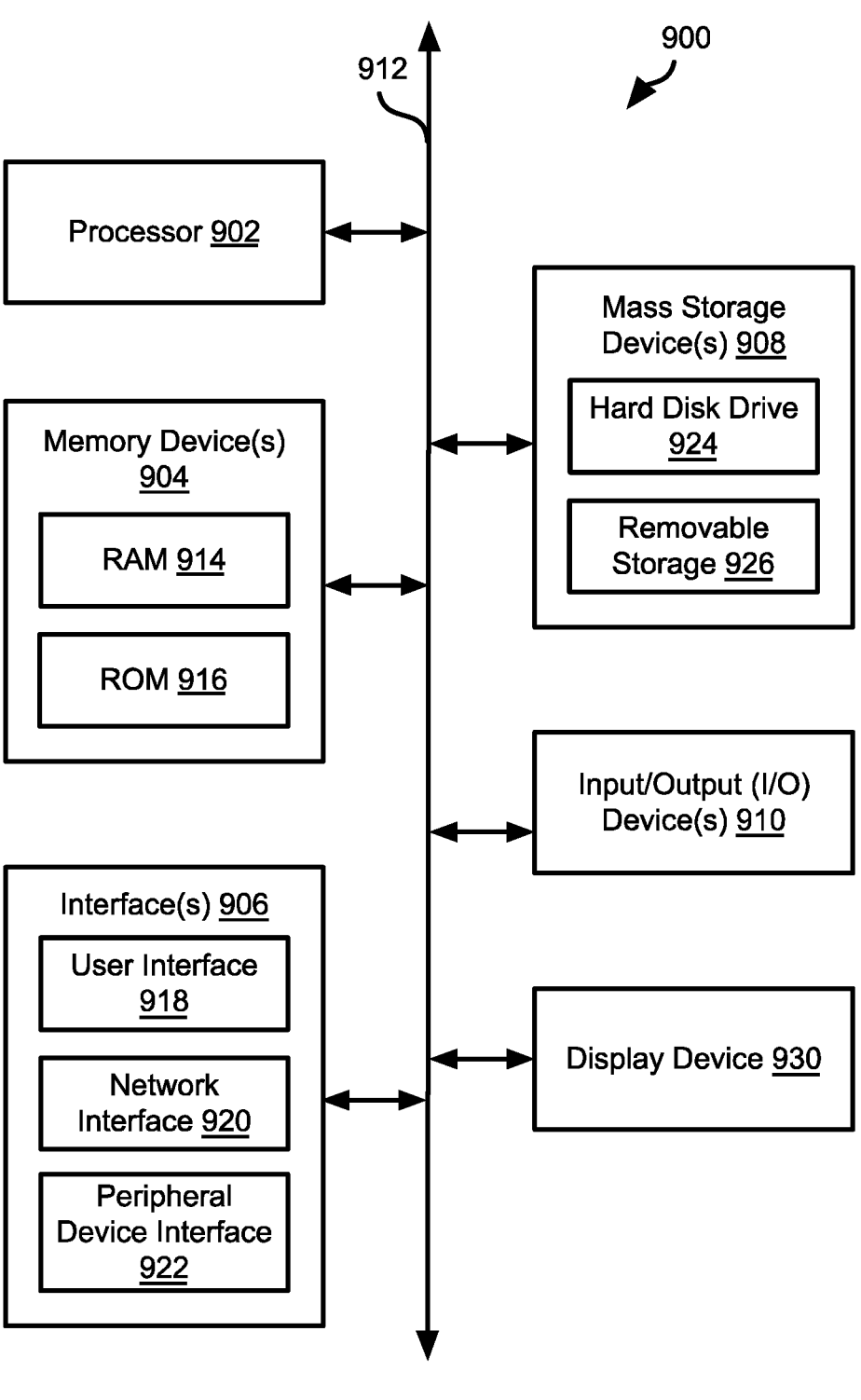
FIG. 9 is a schematic block diagram of an example computing device suitable for implementing methods in accordance with embodiments of the invention.

FIG. 9 is a block diagram illustrating an example computing device 900. Computing device 900 may be used to perform various procedures, such as those discussed herein. The servers 102, orchestrator 106, workflow orchestrator 122, and cloud computing platform 104 may each be implemented using one or more computing devices 900. The orchestrator 106, and workflow orchestrator 122 may be implemented on different computing devices 900 or a single computing device 900 may execute both of the orchestrator 106, and workflow orchestrator 122.

Computing device 900 includes one or more processor(s) 902, one or more memory device(s) 904, one or more interface(s) 906, one or more mass storage device(s) 908, one or more Input/output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more peripheral interfaces such as interfaces for printers, pointing devices (mice, track pad, etc.), keyboards, and the like.

Bus 912 allows processor(s) 902, memory device(s) 904, interface(s) 906, mass storage device(s) 908, I/O device(s) 910, and display device 930 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
a computing device including a plurality of processing devices and one or more memory devices operably coupled to the plurality of processing devices, the one or more memory devices storing executable code that, when executed by the plurality of processing devices, causes the plurality of processing devices to:
allocate a first portion of the plurality of processing devices to execute an operating system in a first power state and such that interrupt requests are permitted for the first portion of the plurality of processing devices;
allocate a second portion of the plurality of processing devices to an isolated shared pool for which the interrupt requests are not permitted, the second portion including multiple processing devices of the plurality of processing devices;
configure a plurality of containers to execute on the second portion of the plurality of processing devices such that each processing device of the multiple processing devices is usable by each container of the plurality of containers; and
execute a plurality of application instances in a second power state in the plurality of containers, the second power state having lower availability and lower power consumption than the first power state, the first portion of the plurality of processing devices being isolated from the plurality of application instances.

2. The apparatus of claim 1, wherein the plurality of application instances are configured to use the second portion of the plurality of processing devices non-exclusively of one another.

3. The apparatus of claim 1, wherein the executable code, when executed by the plurality of processing devices, further causes the plurality of processing devices to:
receive a power profile defining allocation of the second portion of the plurality of processing devices and the second power state; and
in response to receiving the power profile, configure the computing device to allocate the second portion of the plurality of processing devices to the plurality of application instances and operate the second portion of the plurality of processing devices in the second power state.

4. The apparatus of claim 3, wherein:
a first portion of the plurality of application instances and a second portion of the plurality of application instances are isolated from one another; and
the first portion of the plurality of application instances are part of a first pod and the second portion of the plurality of application instances are part of a second pod.

5. The apparatus of claim 1,
wherein the executable code, when executed by the plurality of processing devices, further causes the plurality of processing devices to:
allocate the second portion of the plurality of processing devices to a first portion of the plurality of application instances and allocated a third portion of the plurality of processing devices to a second portion of the plurality of application instances to reduce power consumption as compared to alternative allocations of the second and third portions of the plurality of processing devices.

6. The apparatus of claim 1,
wherein the executable code, when executed by the plurality of processing devices, further causes the plurality of processing devices to:
allocate the second portion of the plurality of processing devices to a first portion of the plurality of application instances and allocated a third portion of the plurality of processing devices to a second portion of the plurality of application instances according to power consumption, an anti-affinity requirement, and minimum required power states for the plurality of application instances.

7. The apparatus of claim 1, wherein the first portion of the plurality of processing devices further execute an orchestrator agent.

8. The apparatus of claim 7, wherein the orchestrator agent is a KUBERNETES agent.

9. The apparatus of claim 7, wherein the orchestrator agent implements a KUBERNETES pod.

10. The apparatus of claim 1, wherein the executable code, when executed by the plurality of processing devices, further causes the plurality of processing devices to generate groups of one or more processing devices of the plurality of processing devices into isolated shared pools having improved resource utilization.

11. The apparatus of claim 10, wherein the executable code, when executed by the plurality of processing devices, further causes the plurality of processing devices to execute containers on the one or more processing devices of each group of the groups, the containers being instantiated in response to requests including one or more of fractional processing device allocation requests, best effort processing device allocation requests, or burstable processing device allocation requests.

12. A method comprising:
allocating, by a computing device, a first portion of a plurality of processing devices of the computing device to execute an operating system in a first power state and such that interrupt requests are permitted for the first portion of the plurality of processing devices;
allocating, by the computing device, a second portion of the plurality of processing devices to an isolated shared pool for which the interrupt requests are not permitted, the second portion including multiple processing devices of the plurality of processing devices;

configuring a plurality of containers to execute on the second portion of the plurality of processing devices such that each processing device of the multiple processing devices is usable by each container of the plurality of containers; and executing a plurality of application instances in a second power state in the plurality of containers, the second power state having lower availability and lower power consumption than the first power state, the first portion of the plurality of processing devices being isolated from the plurality of application instances.

13. The method of claim 12, wherein the one or more application instances include a plurality of application instances are configured to use the second portion of the plurality of processing devices non-exclusively of one another.

14. The method of claim 12, further comprising:

receiving, by the computing device, a power profile defining allocation of the second portion of the plurality of processing devices and the second power state; and in response to receiving the power profile, configuring, by the computing device, the computing device to allocate the second portion of the plurality of processing devices to the plurality of application instances and operate the second portion of the plurality of processing devices in the second power state.

15. The method of claim 14, wherein:

a first portion of the plurality of application instances and a second portion of the plurality of application instances are isolated from one another.

16. The method of claim 12, further comprising:

allocating, by the computing device, the second portion of the plurality of processing devices to a first portion of the plurality of application instances and allocated a third portion of the plurality of processing devices to a second portion of the plurality of application instances to reduce power consumption as compared to alternative allocations of the second and third portions of the plurality of processing devices.

17. The method of claim 12, further comprising:

allocating, by the computing device, the second portion of the plurality of processing devices to a first portion of the plurality of application instances and allocated a third portion of the plurality of processing devices to a second portion of the plurality of application instances according to power consumption, an anti-affinity requirement, and minimum required power states for the plurality of application instances.

18. The method of claim 12, wherein the first portion of the plurality of processing devices further execute an orchestrator agent.

19. The method of claim 18, wherein the orchestrator agent is one of a KUBERNETES agent and a KUBERNETES pod.

20. A non-transitory computer-readable medium storing executable code that, when executed by a computing device including a plurality of processing devices, causes the plurality of processing devices to:

allocate a first portion of the plurality of processing devices to execute an operating system in a first power state and such that interrupt requests are permitted for the first portion of the plurality of processing devices;

allocate a second portion of the plurality of processing devices to an isolated shared pool for which the interrupt requests are not permitted, the second portion including multiple processing devices of the plurality of processing devices;

configure a plurality of containers to execute on the second portion of the plurality of processing devices such that each processing device of the multiple processing devices is usable by each container of the plurality of containers; and execute a plurality of application instances in a second power state in the plurality of containers, the second power state having lower availability and lower power consumption than the first power state, the first portion of the plurality of processing devices being isolated from the plurality of application instances.

* * * * *